No. 719,923. PATENTED FEB. 3, 1903.
H. P. P. WEST.
DOUGH CUTTING AND WEIGHING MACHINE.
APPLICATION FILED OCT. 24, 1902.
NO MODEL.

Fig. 1.

Fig. 2.

Witnesses,
J. H. Nurse
Dudley Moss

Inventor,
Henry P. P. West
By Dewey Strong & Co.
atty

UNITED STATES PATENT OFFICE.

HENRY P. P. WEST, OF SAN FRANCISCO, CALIFORNIA.

DOUGH CUTTING AND WEIGHING MACHINE.

SPECIFICATION forming part of Letters Patent No. 719,923, dated February 3, 1903.

Application filed October 24, 1902. Serial No. 128,624. (No model.)

*To all whom it may concern:*

Be it known that I, HENRY P. P. WEST, a citizen of the United States, residing in the city and county of San Francisco, State of California, have invented an Improvement in Dough Cutting and Weighing Machines; and I hereby declare the following to be a full, clear, and exact description of the same.

My invention relates to improvements in self feeding and weighing machines, and particularly to that class of machines which are designed for the weighing of plastic materials, such as dough.

In bake-shops and the like it is customary to weigh out the quantity of dough going to form each separate loaf of bread.

The object of my invention is to provide a continuously-operating machine into which a mass of dough may be fed and which machine will automatically separate the desired quantity from the mass and weigh and deliver the same.

It consists of the parts and the construction and combination of parts hereinafter more fully described, having reference to the accompanying drawings, in which—

Figure 1 is a perspective view of my invention. Fig. 2 is a partial perspective view of same, showing belt-shifting mechanism.

A represents the supporting-frame of my apparatus. Drums 2 are disposed at either end of the frame, and sprockets 3, over which pass the chains 4, are secured to and are turnable with the drums. An endless conveyer or belt 5 passes over the drums and is loosely laced at the sides to the chains, as shown at 6. The upper plane of the conveyer is supported, except for a central space 7, upon a table 8. The belt is preferably of canvas or other light and flexible material and is of such length that it will sag into the opening 7 and rest upon a platform 9 on the scale-beam 10. The dough or other material to be weighed is fed by a chute 11 upon the belt immediately over the scale-platform 9. Suitable rollers 12, in connection with the chute, roll the dough out into a sheet of desired thickness, while a cutter 13 is actuated on the depression of the scale-platform to sever the portion of dough upon the belt from the remaining mass. The conveyer, cutter, and rollers have intermittent movements coördinate with the oscillation of the scale-beam. In operation a charge of dough is fed onto the conveyer while the latter is at rest, the dough weighed and cut, after which the belt moves to carry the dough so segregated onto table 8. The scale-platform then being relieved of its load is in readiness for the next charge, the belt is stopped, the cutter lifted, and the rollers started in motion, and the process of weighing, cutting, and delivering thus goes on continuously. These several movements may be effected in a variety of ways. In the present instance I have shown the following means:

The scale-beam is supported intermediate of its ends upon suitable knife-edges on the standard 14, and a poise 15 is slidable on the graduated end of the beam.

16 is a rock-shaft, having an arm 17, connecting by a link 18 with a disk 19, suitably pivoted on the frame. This disk has a notch 20 on its periphery adapted to be engaged by a pawl 21. A counterweight 22 on shaft 16 tends to throw the latter always in a direction to turn the disk and carry the notch out of engagement with the pawl. Suitable trip means, as the arm 23, is provided between the scale-beam and pawl to lift the latter and release the disk on the depression of the platform 9. The rock-shaft carries a second arm 24, which connects, by means of a rod 25, with a bell-crank lever 26, which has one arm connected with a crank 27 on the cutter-shaft, another arm connected by a rod 28 with a belt-shifting mechanism 29, and a third arm connected with a lever 30, which is engaged on each revolution of the drums by a projection 31 on one of the drum-shafts. Power is applied to drive the rollers 12 and conveyer 5 alternately. As here shown, respective fixed and loose pulleys 32 33 are provided upon the shaft of one of the drums. A belt 34, receiving constant motion from a suitable source of power, is shifted from one of these pulleys to the other on the oscillation of shaft 16 by means of the mechanism 29. The loose pulley 33 carries a belt 35, which connects with the rollers 12. Thus when belt 34 is upon pulley 32 the conveyer will move and the rollers will be at rest.

Vice versa, when the belt 34 is on pulley 33 the conveyer will stand still and the roller will turn.

In the operation of the machine as thus described the poise 15 is adjusted on the beam to the desired weight of each charge of dough that is to go upon the conveyer, due allowance being made for such pressure as the conveyer itself may exert on the platform. Assuming the conveyer to be at rest and the rock-shaft turned to lift counterweight 22, the disk will have been rotated until pawl 21 will have engaged notch 20 to hold the shaft against weight 22, the cutter will be in lifted position, and the rollers 12 in motion. As soon as a sufficient quantity of material is upon the platform 9 to overcome poise 15 and oscillate the beam the arm 23 trips pawl 21, releasing the disk and allowing the rock-shaft to turn by reason of counterweight 22. The oscillation of the shaft causes the lever 26 to be operated to turn the cutter, shift the belt to stop the rollers and start the conveyer, and to throw the end of lever 30 into the path of the projection 31. The conveyer moves a distance equal to the circumferential length of a drum 2, which is sufficient to carry the material out of the way of the scale-platform, whereupon the projection 31 engages the end of lever 30 to oscillate the rock-shaft, reëngage the stop 19, lift the cutter, and shift the belt to stop the conveyer and drive the rollers again.

Having thus described my invention, what I claim, and desire to secure by Letters Patent, is—

1. The combination in an automatic dough cutting and weighing machine, of an intermittently-movable conveyer-belt, a supporting-table for the upper plane of the belt, having an opening therein, a scale-platform extending into said opening and on which a section of said belt is adapted to rest, and an intermittently-operating cutter having a movement coördinate with the oscillation of the scale-platform.

2. The combination in a machine of the class described, of an endless conveyer, a supporting-table for said conveyer, having an opening, a scale-platform extending into said opening and supporting a section of said conveyer, feed mechanism, and a means by which said conveyer, platform and feed mechanism are given coördinate movement.

3. The combination in a machine of the class described, of an endless conveyer, a table-support therefor, having an opening by which a portion of the conveyer is unsupported from below, a scale-platform extending into said opening and supporting a section of said conveyer, feed mechanism including an oscillating cutter and revoluble rollers, and means by which the conveyer, platform, cutter and rollers are given an intermittent coördinate movement.

4. The combination in a machine of the class described, of an intermittently-movable conveyer, said conveyer including sprocket-chains and a belt of flexible material loosely sustained intermediate of said chains, a scale-platform supporting a section of said belt, and feed mechanism operating intermittently in relation to the oscillation of said platform.

5. The combination in a machine of the class described, of an intermittently-movable endless conveyer, a supporting-table for the upper plane of said conveyer, an opening in said table, a scale-platform operating in said opening, and feed mechanism operated in unison with the oscillation of said platform.

6. The combination in a machine of the class described, of an endless conveyer, means forming a support for the major portion of the upper plane of the conveyer and leaving a portion of said conveyer unsupported, a scale-platform extending transversely beneath the unsupported section of said conveyer, and feed mechanism including a cutter, revoluble rollers, and connections between said conveyer, platform, cutter and rollers whereby the several parts operate coördinately.

7. The combination in a machine of the class described, of an endless-belt conveyer unsupported at a point in its length, a scale-beam extending substantially at right angles to the travel of the conveyer and fulcrumed intermediate of its ends, a platform on one end of said beam in line beneath the unsupported section of the conveyer, a movable poise on the other end of said beam, a rock-shaft, feed mechanism and connection between said rock-shaft and the several parts by which said parts are operated in relation to the oscillation of the scale-beam.

8. The combination in a machine of the character described, of an intermittently-movable endless conveyer, a table-support therefor, said table having an opening whereby a section of the conveyer is unsupported thereby, a scale-beam in line with the unsupported section of the conveyer, a movable poise on said beam, a rock-shaft and intermittently-operated feed mechanism, and stop mechanism interposed between said scale-beam and said rock-shaft.

9. The combination in a machine of the class described, of an endless conveyer, feed-rollers and cutter, a scale-beam supporting a section of said conveyer, a poise on said beam, a rock-shaft, connections between said rock-shaft and the cutter, and connections between said rock-shaft conveyer and rollers, and means by which said rock-shaft is oscillated on movement of the scale-beam.

In witness whereof I have hereunto set my hand.

HENRY P. P. WEST.

Witnesses:
S. H. NOURSE,
JESSIE C. BRODIE.